(12) United States Patent
Fleet et al.

(10) Patent No.: US 8,462,179 B2
(45) Date of Patent: Jun. 11, 2013

(54) SCENE INDEPENDENT METHOD FOR IMAGE FORMATION IN LENSLET ARRAY IMAGERS

(75) Inventors: Erin F. Fleet, Springfield, VA (US);
Andrey V. Kanaev, Lorton, VA (US);
Dean A Scribner, Arlington, VA (US);
John R. Ackerman, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 903 days.

(21) Appl. No.: 12/505,851

(22) Filed: Jul. 20, 2009

(65) Prior Publication Data

US 2010/0013857 A1 Jan. 21, 2010

Related U.S. Application Data

(60) Provisional application No. 61/081,845, filed on Jul. 18, 2008.

(51) Int. Cl.
*G09G 5/00* (2006.01)

(52) U.S. Cl.
USPC .......................................... 345/629; 345/619

(58) Field of Classification Search
USPC ........................................................ 345/629
See application file for complete search history.

(56) References Cited

U.S. PATENT DOCUMENTS

| | | | |
|---|---|---|---|
| 5,412,200 A * | 5/1995 | Rhoads | 250/201.9 |
| 6,084,227 A * | 7/2000 | Rhoads | 250/201.9 |
| 6,958,862 B1 | 10/2005 | Joseph | |
| 7,009,652 B1 | 3/2006 | Tanida et al. | |
| 2005/0111009 A1* | 5/2005 | Keightley et al. | 356/602 |
| 2006/0082787 A1* | 4/2006 | Franke et al. | 356/604 |
| 2008/0033677 A1* | 2/2008 | Tomaney et al. | 702/85 |

FOREIGN PATENT DOCUMENTS

EP 04819868.3 9/2006

OTHER PUBLICATIONS

A. V. Kanaev, D. A. Scribner, E. F. Fleet, and J. R. Ackerman, "Highly Compact Sensors Based on Lenslet Imaging Arrays," presented at OSA & SPIE Optics in the Southeast, Charlotte NC, Sep. 6-8, 2006.
A. V. Kanaev, D. A. Scribner, E. F. Fleet, and J. R. Ackerman, "Analysis and application of multi-frame super-resolution processing for conventional imaging systems and lenslet arrays," Applied Optics, vol. 46 Issue 20, pp. 4320-4328 (2007).
J. M. Schuler and D. A. Scribner, "Increasing spatial resolution through temporal super-sampling of digital video," Opt. Eng. 38, pp. 801-805 (1999).

(Continued)

*Primary Examiner* — M Good Johnson
(74) *Attorney, Agent, or Firm* — Amy L. Ressing; Kerry L. Broome

(57) ABSTRACT

A method and system is provided for performing high-resolution image assembly regardless of observed scene content. An imaging system, including a focal plane array and lenslet array can be calibrated to account for subimage shifts. A calibration module can determine the subimage shifts by calculating an average point source position reference point coordinates for each of the subimages, and then determining the difference between the average point source position and the reference point coordinates for each subimage. The imaging system can then be calibrated utilizing the subimage shifts for each of the plurality of subimages. Finally, an assembly module can perform a high-resolution image assembly with the calibrated imaging system.

18 Claims, 5 Drawing Sheets

OTHER PUBLICATIONS

J. Tanida, T. Kumagai, K. Yamada, S. Miyatake, K. Ishida, T. Morimoto, N. Kondou, D. Miyazaki, and Y. Ichioka, "Thin Observation Module by Bound Optics (TOMBO): concept and verification," Applied Optics 40, 1806-1813 (2001).

Y. Kitamura, R. Shogenji, K. Yamada, S. Myiatake, M. Miyamoto, T. Morimoto, Y. Masaki, N. Kondou, D. Miyazaki, J. Tanida, and Y. Ichioka, "Reconstruction of a high resolution image on a compound-eye image-capturing system," Applied Optics 43, 1719-1727 (2004).

K. Nitta, R. Shogenji, S. Myiatake, and J. Tanida, "Image reconstruction for thin observation module by bound optics by using iterative backprojection method," Applied Optics 45, 2893-2900 (2006).

D. J. Brady, M. A. Fiddy, U. Shahid, and T.J. Suleski, "Compressive optical Montage photography initiative: noise and error analysis," presented at the OSA Topical Meeting on Computational Optical Sensing and Imaging, Charlotte, NC, Jun. 6-8, 2005.

M. W. Haney, "Performance scaling in flat imagers," Applied Optics 45, 2901-2910 (2006).

S.C. Park, M.K. Park, and M.G. Kang, "Super-resolution image reconstruction: technical overview," IEEE Signal Processing Magazine, 03, pp. 21-36 (2003).

A. Shaum and M. McHugh, "Analytic Methods of image registration: displacement estimation and resampling," NPL Rep. 9298 (Naval Research Laboratory, Washington, D.C., Feb. 28, 1991).

\* cited by examiner

SCENE INDEPENDENT METHOD FOR IMAGE FORMATION IN LENSLET ARRAY IMAGERS

CROSS-REFERENCE TO RELATED APPLICATIONS

This application claims priority to provisional patent application entitled, "Scene Independent Method for Image Formation in Lenslet Array Imagers," filed on Jul. 18, 2008, and assigned U.S. Application No. 61/081,845; the entire contents of which are hereby incorporated by reference.

FIELD OF THE INVENTION

The invention relates generally to flat imaging systems. More particularly, the invention relates to a method or system that can performs high-resolution image assembly from undersampled sub-images obtained from compact imaging system using lenslet array

BACKGROUND

In a conventional system a traditional imager system typically consists of a single lens and a focal plane array. Recent demand for highly compact thin imaging systems led to broad investigation efforts in sensor design based on focal plane array technologies. A system based on this more recent architecture for reducing the imager thickness can be a system that uses a lenslet array to accumulate a series of sub-images. A specific example of this new architecture is the thin observation module by bound optics (TOMBO) system.

This TOMBO architecture differs from the conventional system because it is a flat architecture that can consist of a lenslet array, a baffle preventing optical cross-talk, and an equivalent focal plane array. If the lenslet array is to be equal to the conventional system lens then n×n number of lenslets can be required to cover the area of the detector, ideally keeping the number of incident photons the same for both configurations. As a result, the depth of optics and sub-image size are n times smaller than the conventional system. The sub-images of the lenslet array can be processed in a manner similar to multi-frame super-resolution to obtain a fully sampled, high-resolution image. The processing task is to reconstruct an image that has resolution as close as possible to the conventional camera lens and the same focal plane array.

The principle of multi-frame super-resolution is that the pixel values from all sub-images are mapped onto an upsampled image plane. Each sub-image position on the super-resolved image plane is determined by its global shift with respect to a reference subimage. In multi-frame super-resolution processing these shifts can be estimated either by iterative procedure or by sub-image registration. The former method is unsuitable for real time applications due to possible convergence problems and heavy computational load, which dramatically increases with respect to the number of sub-images. The accuracy of the latter approach is highly dependent on the nature of the observed scene, such as having some knowledge of the probability density function or noise characteristics of the observed scene.

Accordingly, there remains a need for a method or system that can performs high-resolution image assembly from undersampled sub-images obtained from compact imaging system using lenslet array utilizing scene-independent processing and in a method suitable for real-time applications.

SUMMARY OF THE INVENTION

The present invention provides a method for performing high-resolution image assembly regardless of observed scene content by measuring a plurality of point source positions for a plurality of subimages. The point source positions can be projected from a point source, such as a laser, onto a small number of pixels within each subimage, and can be imaged. The point source can then be shifted multiple times to create a sub-pixel shift of the point source position within each of the subimages, and to create multiple point source positions for each subimage. An average point source position for each of the subimages can be determined by averaging the plurality of point source positions obtained after each point source shift. A centroid for each of the plurality of subimages can be determined. The centroid of one subimage can be utilized to produce a reference point coordinate. A subimage shift for each subimage can then be determined by taking the difference between an average point source position for each sub-image and the reference point coordinate of the subimage chosen as the reference. The imaging system can then be calibrated utilizing the subimage shifts for each of the plurality of subimages and a high-resolution image assembly can be performed with the calibrated imaging system.

The present invention provides a system for performing high-resolution image assembly in a lenslet array system regardless of observed scene content. The system includes an imaging system that includes a focal plane array and a lenslet array. Furthermore, a calibration module can be included that is configured to measure a plurality of point source positions for a plurality of subimages, determine a centroid for each of the plurality of subimages, determine a subimage shift for each of the plurality of subimages, and calibrate the imaging system utilizing the subimage shifts for each of the plurality of subimages. Finally, an assembly module can be included that is configured to perform a high-resolution image assembly with the calibrated imaging system The present invention provides a method for calibrating an imaging system regardless of observed scene content to perform high-resolution image assembly by defining a plurality of subimage shifts, the subimage shifts varying based on distance between an object and a target, for a plurality of distances less than a far-field calibration. The subimage shifts can be calculated using a formula $\delta = xF/D$ where $\delta$ is the subimage shift, D is the distance, F is a lenslet focal length, and x is a separation of a lenslet center from an overall array center. An imaging system can be calibrated by utilizing the plurality of subimage shifts. The imaging system can then perform a high-resolution image assembly with the calibrated imaging system. The imaging system can determine the distance from the object to the target; select the subimage shift associated with that distance; and process the image with the selected subimage shift. In one embodiment, the imaging system can determine the distance from the object to the target by receiving an input from a user of the imaging system comprising the distance from the object to the target. In another embodiment, the imaging system can determine the distance from the object to the target by empirically deriving the distance from the object to the target.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

Figure 1:
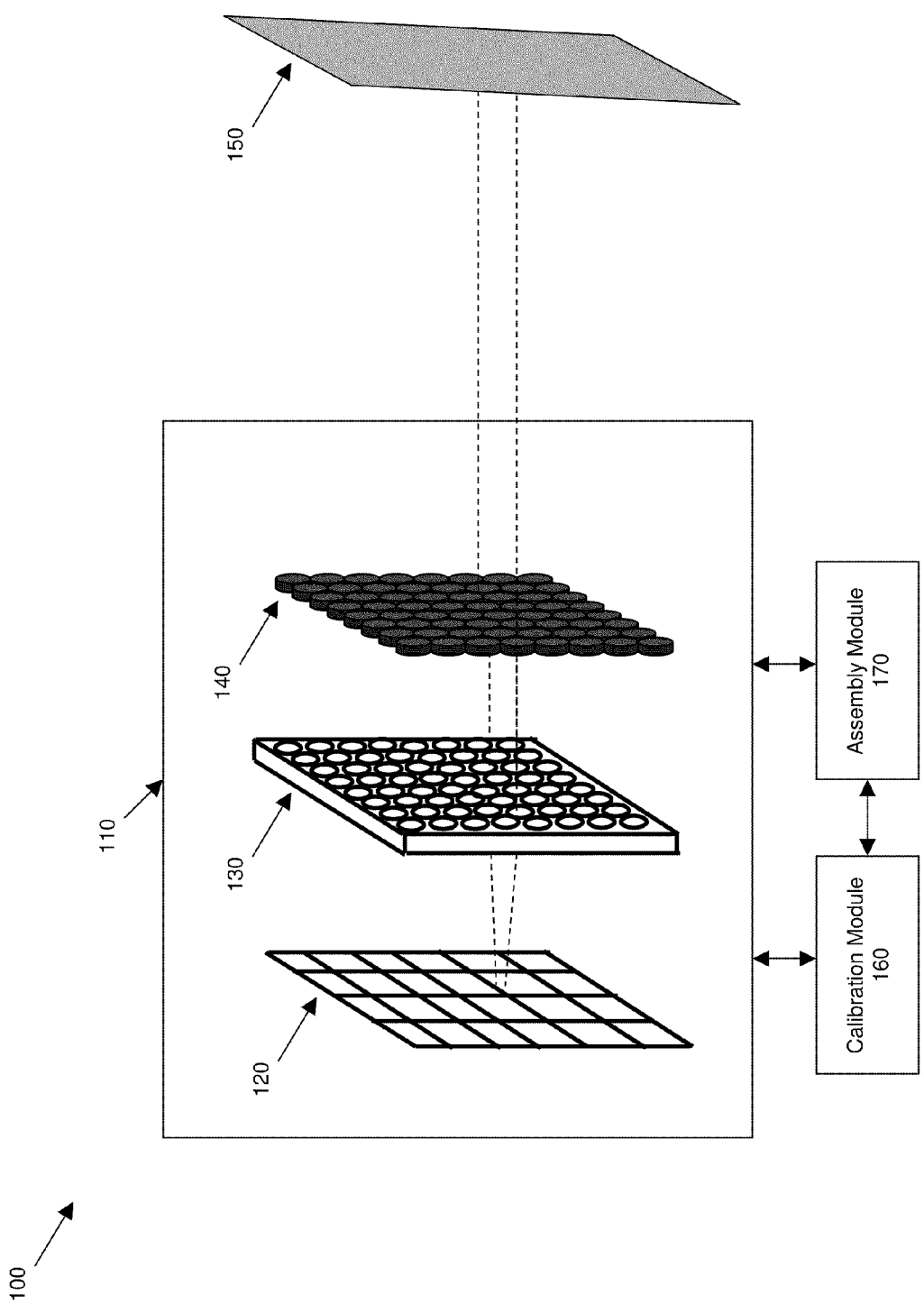
FIG. 1 is a block diagram of an imaging system in accordance with an exemplary embodiment of the invention.

Referring now to the drawings, in which like numerals represent like elements, aspects of the exemplary embodiments will be described in connection with the drawing set.

FIG. 1 is a block diagram of an imaging system 100 in accordance with an exemplary embodiment of the invention. Recent demand for highly compact flat imaging systems that use existing focal plane array (FPA) technologies has led to innovative new sensor designs. One specific design, which can be used in accordance with an exemplary embodiment of the invention, for reducing the imager thickness is the thin observation module by bound optics (TOMBO) system 110. The TOMBO system 110 can use a lenslet array 140 to accumulate a series of sub-images of a target 150. The TOMBO system 110 comprises a lenslet array 140, an optical mask (or baffle) 130 that can prevent optical cross talk, and an equivalent focal plane array 120.

In the TOMBO system 110, the lenslet array 140 can comprise a plurality of individual lenslets. Typically, the lenslet array is arranged in an n×n lenslet structure. For example, the lenslet array 140 can be an 8×8 lenslet array. The TOMBO system 110 can operate by obtaining a plurality of low-resolution subimages collected by the lenslet array 140, and then assembling the subimages into a high-resolution image. In the example of an 8×8 lenslet array, the TOMBO system 110 can collect 64 low-resolution subimages.

In a lenslet array 140, typically all individual lenslets are fixed; and therefore, the relation between the sub-images should remain constant. This constant relation can allow for a single precise measurement of each sub-image position to determine a subimage shift and successive use of the subimages and shift in high-resolution image restoration. These subimage shifts can be measured precisely in a controlled laboratory environment, and then can be incorporated into the image assembly algorithm. This a priori calibration can provide constant and nearly maximum possible image resolution enhancement (relative to undersampled sub-images) for all successive imager data collections independent of viewing conditions or scene content. Image assembly algorithm is thus dramatically reduced in complexity and computational time compared to all existing image assembly algorithms.

In accordance with an exemplary embodiment of the invention, the imaging system 100 can comprise a calibration module 160 that can be configured to determine the subimage shifts. The calibration module 160 can be configured to measure a plurality of point source positions for a plurality of subimages. The calibration module 160 can image a series of the point source positions and the point source positions can be projected from a point source, such as a laser, onto a small number of pixels within each subimage. For example, in an exemplary embodiment, the laser can be pointed at the lenslet array 140. This can map as a point spread function onto a small number of focal plane array pixels in each subimage.

To minimize the subsampling effect of the relatively large size of pixels, the point source can be shifted to create a sub-pixel shift of the point source position within each of the subimages. For example, the point source can be shifted relative to the imager in the plane perpendicular to the virtual target-imager line such that each step motion corresponds to a sub-pixel shift of the point source on the image plane. This step of shifting the point source to produce new point source positions with sub-pixel shifts can be performed multiple times to create multiple point source positions for each subimage. For example, at laser position a, subimage-1 through subimage-n (in an 8×8 array, n=64) will each have a point source position. When the laser is shifted to position b, subimage-1 through subimage-n will each have a different point source position.

The calibration module 160 can store the multiple point source positions at different point source starting positions for each subimage. After collecting the multiple point source positions, the calibration module 160 can determine an average point source position for each of the subimages by averaging the multiple point source positions obtained after each point source shift. The average point source position for each subimage can subsequently be used in determining the subimage shifts.

For each subimage on the focal plane array 120 there can be a centroid. The centroid positions can be utilized by the calibration module 160 to determine subpixel shift for each of the plurality of subimages. For example, the centroid of one subimage can be used as a reference point coordinate. The resulting reference point coordinate can be utilized by the calibration module 160 to determine the subimage shift for each subimage. To calculate the subpixel shift for the remaining subimages, the calibration module 160 can determine the difference between the average point source position for each subimage and the reference point coordinate of the subimage chosen as the reference. These differences can represent the subimage pixel shifts of each of the subimages and is illustrated, as an example, in FIG. 2.

Figure 2:
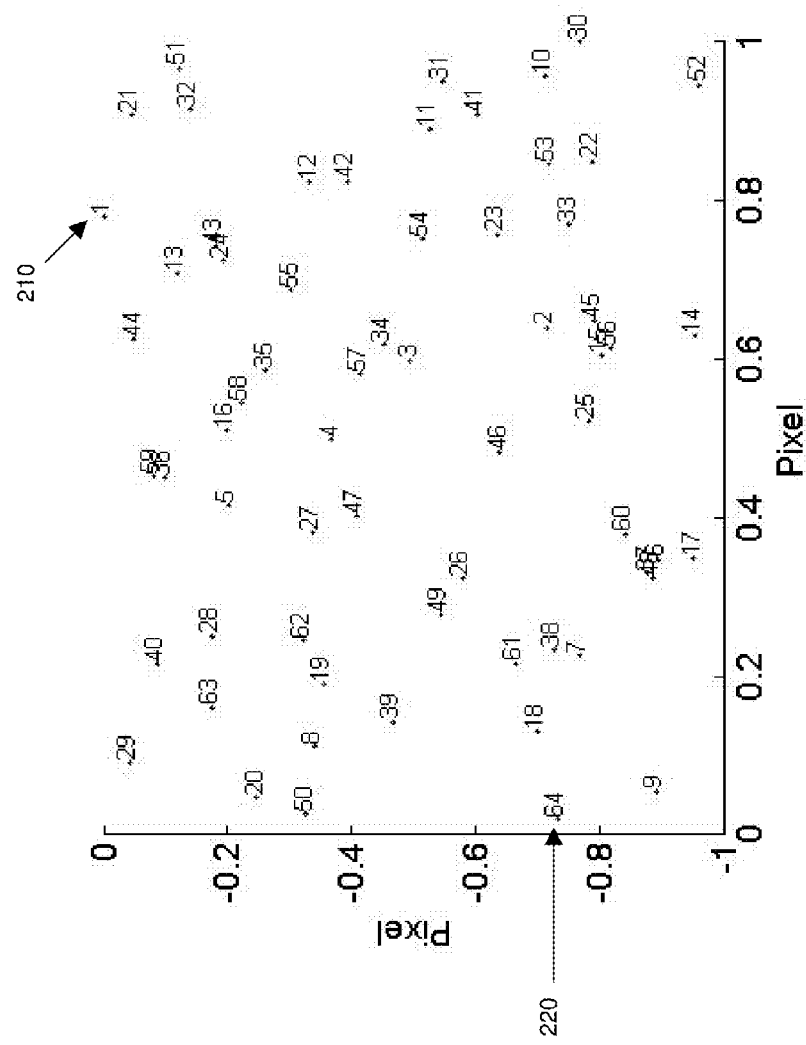
FIG. 2 is a scatter plot illustrating the subimage shifts of a plurality of subimages.

FIG. 2 is a scatter plot illustrating the subimage shifts of a plurality of subimages. The numbers in the scatter plot in FIG. 2 represent the particular numbered subimage (e.g. subimage-1 (210) through subimage-64 (220)). The x and y planes represent the relative shifts of each subimage.

After determining the relative shifts for each subimage, the calibration module 160 can incorporate the subimage shift for each of the plurality of subimages into an assembly algorithm in the assembly module 170. The assembly module can be included in the imaging system 100. For example, if the point x=0 and y=0 is considered the reference point coordinate, then in order to assemble a high-resolution image, subimage-1, where the x-coordinate is ~0.8 and the y-coordinate ~0, needs to be shifted 0.8 pixel in the negative x-direction and 0 pixel in y-direction.

The assembly module 170 can be configured to perform a high-resolution image assembly with the imaging system 110. The purpose of the image reconstruction process is to combine all low-resolution sub-images into single high-resolution image. The assembly module can utilize the assembly algorithm to shift subimages from an irregular grid onto a regular upsampled grid, and then combine the shifted subimages on the regular upsampled grid into a single high-resolution image. For the high-resolution image assembly, interpolation methods, known to one of ordinary skill in the art, can be chosen such as nearest neighbor, linear, cubic, or higher order, if necessary.

The assembly module 170 can then filter the upsampled image containing all the information incorporated in the subimages using the Wiener filter. The Wiener filter can provide correction for optical system blur and detector sampling effects. This operation utilizes a priori known information about an optical system, such as lenslet point spread function and detector shape; therefore avoiding more complex iterative processing which attempts to infer lenslet characteristics.

In an exemplary embodiment of the present invention, the calibration module 160 and assembly module 170 can be implemented in a computer system that comprises instructions stored in a machine-readable medium and a processor that executes the instructions.

Figure 3:
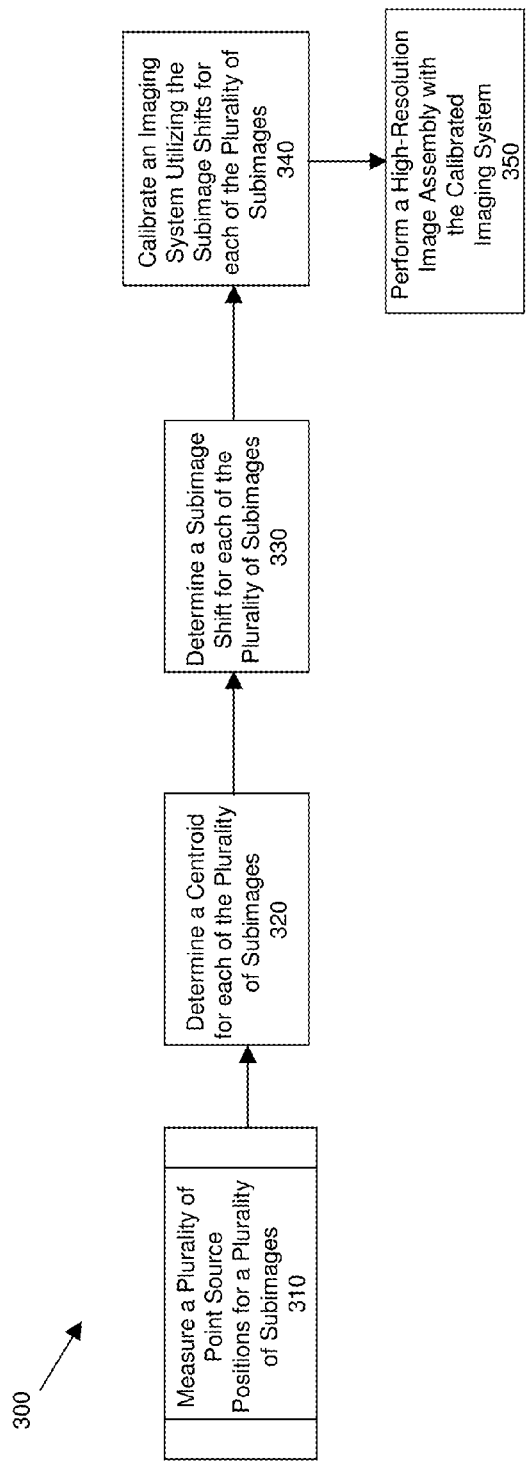
FIG. 3 is a flow chart illustrating an exemplary method for performing high-resolution image assembly regardless of observed scene content.

FIG. 3 is a flow chart illustrating an exemplary method for performing high-resolution image assembly regardless of observed scene content. In Step 310, a plurality of point source positions can be measured for a plurality of subimages. In an exemplary embodiment of the present invention, a calibration module 160 can be configured to measure the plurality of point source positions for the plurality of subimages. For example, a point source, such as a laser, can be pointed at the lenslet array 140 to produce a plurality of point source positions, which are represented as a small number of pixels within each subimage. This can map as a point spread function onto a small number of focal plane array pixels in each subimage.

Figure 4:
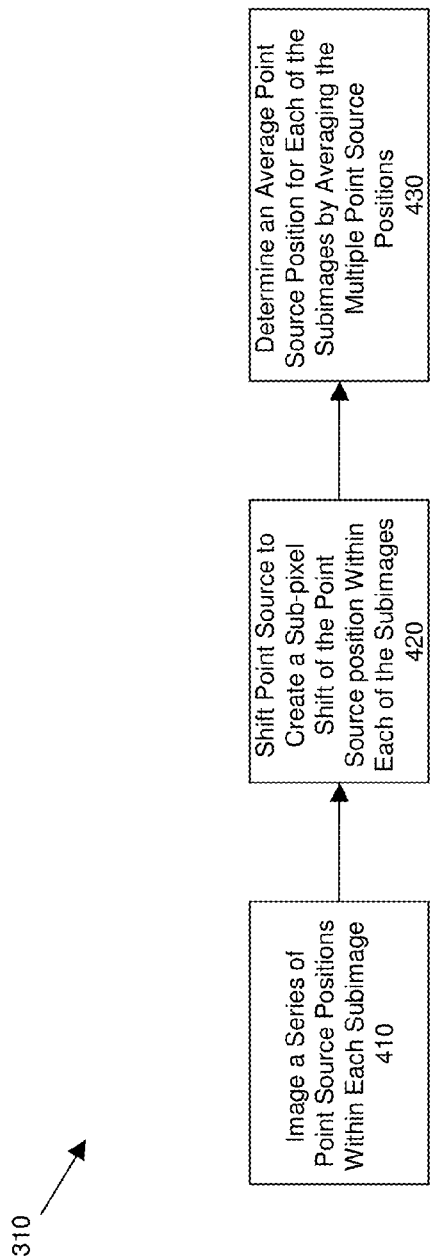
FIG. 4 is a flow chart illustrating an exemplary method for measuring a plurality of point source positions for a plurality of subimages.

FIG. 4 is a flow chart illustrating an exemplary method for measuring a plurality of point source positions for a plurality of subimages. In Step 410, a series of the point source positions within each subimage can be imaged. This step can be accomplished, for example, by the calibration module 160. Subsequently, in Step 420, to minimize the subsampling effect of the relatively large size of pixels, the point source can be shifted to create a sub-pixel shift of the point source position within each of the subimages. This step of shifting the point source to produce new point source positions with sub-pixel shifts can be performed one or more additional times to create multiple point source positions for each subimage. The calibration module 160 can store the multiple point source positions at different point source starting positions for each subimage.

In step 430, after collecting the multiple point source positions, the calibration module 160 can determine an average point source position for each of the subimages by averaging the multiple point source positions obtained after each point source shift. The average point source position for each subimage can subsequently be used in determining the subimage shifts.

Returning to FIG. 3, in Step 320, a centroid for each of the plurality of subimages can be determined. The centroid positions can be utilized by the calibration module 160 to determine subpixel shift for each of the plurality of subimages in Step 330. For example, the centroid of one subimage can be used as a reference point coordinate. To calculate the subpixel shift for the remaining subimages, the calibration module 160 can determine the difference between the average point source position for each subimage and the reference point coordinate of the subimage chosen as the reference.

In Step 340, an imaging system that utilizes the subimage shifts for each of the plurality of subimages can be calibrated by incorporating the subimage shift for each of the plurality of subimages into an assembly algorithm in an assembly module 170. In Step 350, a high-resolution image assembly can be performed with the calibrated imaging system. For example, if the point x=0 and y=0 is considered the reference point, then in order to assemble high-resolution image subimage 1 (x-coordinate is ~0.8 and y-coordinate ~0) needs to be shifted 0.8 pixel in the negative x-direction and 0 pixel in y-direction.

Figure 5:
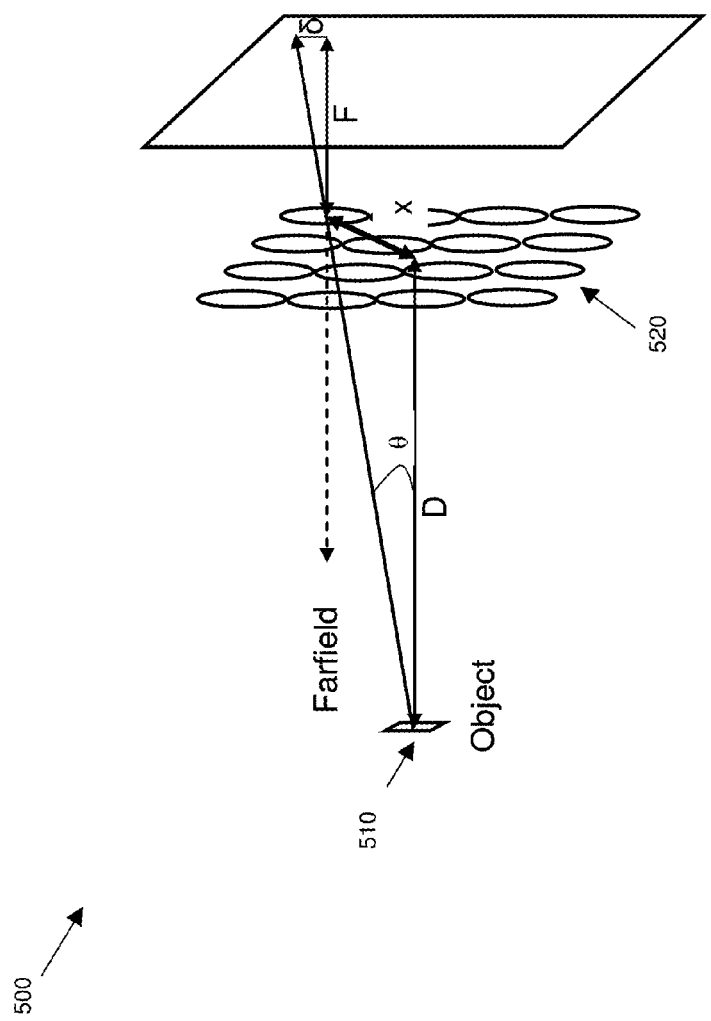
FIG. 5 is a block diagram of an imaging system in accordance with an alternative exemplary embodiment of the invention.

FIG. 5 is a block diagram of an imaging system 500 illustrating an alternative exemplary embodiment of the invention. As previously described, a lenslet array imager can be configured to produce an array of images of a scene. The images can be arranged in a fixed pattern as determined by the geometry of the system, particularly the optical properties and geometrical spacing of the lenslet arrays. Combining the images into a so-called "super" image involves knowing the subimage shift to build up a super-sampled conglomerate image built from some or all of the individual images. A method and system for calculating a subimage shift, calibrating an image system, and performing a high-resolution image assembly with the calibrated imaging system is discussed previously.

However, in an alternative exemplary embodiment, whenever objects in the scene are close enough, the subimage shifts begin to noticeably deviate from the far-field calibration data. This situation is illustrated in FIG. 5, where an object 510 is a distance D from the lenslet array imager 520, which is made up of multiple lenslets. Rays traced from the object 510 typically strike each lenslet of the lenslet array imager 520 at an angle $\theta$ that depends on D. Thus, the image of the object as seen by each lenslet will shift an amount $\delta$ from the center of the lenslet by an amount dependent on D, the lenslet focal length F, and the separation x of the lenslet center from the overall array center. Assuming paraxial ray tracing, known to one of ordinary skill in the art, the following formula for $\delta$ can be used:

$$\delta = xF/D$$

Accordingly, a method for accounting for the proximity shifting of the image features at close distances can be accomplished. In one exemplary embodiment of the present invention, a dependence of the shift as described above can be assumed, and a measured shift matrix, or subimage shift, can be modified each time an image is assembled. For example, the lenslet array 520 can be calibrated in the far field, e.g., where D is so much larger than F that for all x in the lenslet array, $\delta$ is very small compared to a pixel on the detector array. An assembly algorithm could then modify the calibrated subimage shifts whenever an actual imaged scene has objects closer to the sensor, e.g., where D is relatively small.

In an alternative exemplary embodiment of the present invention, a method for accounting for the proximity shifting of the image features can be provided by defining a set of calibrated shift matrices, or subimage shifts, with a different shift matrix, or subimage shift, for each of a several different D's, including a far-field and a nearest-focus calibration. For example, the calibrated system could have multiple settings for different D values. The imaging system could then allow a user to choose the appropriate shift matrix for a given image to be used in the assembly algorithm. Alternatively, the assembly algorithm could reconstruct the imagery with several of the calibration matrices and then select the best result (either by an assembly algorithm or by presenting them to a human user). In one embodiment, the set of subimage shifts, or matrices, can be stored in a calibration module 160.

The imaging system can be calibrated with a plurality of subimage shifts based on different distances from the imaging system to a target. A far-field setting, which is calibrated in accordance with FIGS. 1-4, can be applicable for all distances over a certain distance. For example only, the far-field distance could be used for all distances over ten feet. However, for closer distances (e.g., less than ten feet), the imaging system can have multiple additional subimage shift settings. By way of example, the imaging system could have one setting for pictures taken at a distance of five feet, and another setting for pictures taken a distance of one foot, as well as many other settings for distances less than the far-field setting. The settings for different distances can then be incorporated into the assembly algorithm to be utilized in processing the subsequent image.

In an alternative exemplary embodiment of the present invention, another method for accounting for the proximity shifting of the image features can be provided that combines the two previously described methods. In this embodiment, the imaging system can use a shift dependence to interpolate between the measured shift matrices. For example, if there is a shift matrix for images taken of a scene at different distances $D_1$ and $D_2$, and the current data is of a scene at a distance $D_3$, with $D_1 < D_3 < D_2$, then the shift dependence formula given above could be used to modify the shift matrix at a distance $D_1$ (or $D_2$) to be appropriate for $D_3$. Alternatively, since the multiple shift matrices are measured at known object distances, a shift dependence formula $\delta(D)$ could be empirically derived for the system, and then used by the assembly algorithm.

For any of the discussed methods for accounting for the proximity shifting of the image features at a close distance, the distance D is not necessarily known. In fact, D may vary throughout the image, with some objects in the foreground and some in the background. In practice, either a user or an algorithm (or a combination) might employ shift matrices from multiple distances and compare the resulting reconstructed images, selecting the best one. An algorithm might also be able to extrapolate ranges from by triangulating known feature sizes in the imagery. In another method, the imaging system might use a range finder or other independent measurement system to directly measure D to one or more features in the scene.

For example, these settings can be located on the imaging system where the user can manually select her distance, and that information is incorporated into the assembly algorithm to process the subsequent image. In an alternative embodiment, the user can proceed with capturing an image, and the assembling algorithm can process the image at multiple distances. The processed images can then be presented to the user to select the most appropriate image.

The invention can comprise a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

It should be understood that the foregoing relates only to illustrative embodiments of the present invention, and that numerous changes may be made therein without departing from the scope and spirit of the invention as defined by the following claims.

The invention claimed is:

1. A method for performing high-resolution image assembly, comprising the steps of:
    measuring a plurality of point source positions for a plurality of subimages;
    determining a centroid for each of the plurality of subimages;
    determining a subimage shift for each of the plurality of subimages;
    calibrating an imaging system utilizing the subimage shifts for each of the plurality of subimages; and
    performing a high-resolution image assembly with the calibrated imaging system, wherein the step of performing the high-resolution image assembly does not factor observed scene content.

2. The method of claim 1, wherein the step of measuring a plurality of point source positions for a plurality of subimages comprises imaging a series of the point source positions, wherein the point source positions are projected from a point source onto a small number of pixels within each subimage.

3. The method of claim 2, wherein the step of projecting the point source positions onto the small number of pixels within each subimage is performed with a laser.

4. The method of claim 2, wherein the step of imaging a series of the point source positions further comprises shifting the point source to create a sub-pixel shift of the point source position within each of the subimages.

5. The method of claim 4, wherein the step of shifting the point source to create a sub-pixel shift of the point source position within each of the subimages can be performed a plurality of times to create a plurality of point source positions for each subimage.

6. The method of claim 5, comprising the step of determining an average point source position for each of the subimages by averaging the plurality of point source positions obtained after each point source shift.

7. The method of claim 1, wherein the step of determining a subimage shift for each of the plurality of subimages comprises the steps of:
    utilizing the centroid of one subimage to produce a reference point coordinate; and
    determining the subimage shift for each subimage as a difference between an average point source position for each subimage and the reference point coordinate of the subimage chosen as the reference.

8. The method of claim 1, wherein the step of calibrating an imaging system utilizing the subimage shifts comprises the step of incorporating the subimage shift for each of the plurality of subimages into an assembly algorithm.

9. The method of claim 1, wherein the step of performing a high-resolution image assembly with the calibrated imaging system comprises the steps of:
    utilizing an assembly algorithm to shift subimages from an irregular grid onto a regular upsampled grid; and
    combining the shifted subimages on the regular upsampled grid into a single high-resolution image.

10. The method of claim 1, further comprising the steps of:
    for a plurality of distances less than a far-field calibration, defining a set of subimage shifts, the subimage shifts varying based on distance between an object and a target; and
    calibrating the imaging system utilizing the set subimage shifts based on distance.

11. A system for performing high-resolution image assembly in a lenslet array system, comprising:
    an imaging system, comprising:
        a focal plane array; and
        a lenslet array;
    a calibration module configured to measure a plurality of point source positions for a plurality of subimages, determine a centroid for each of the plurality of subimages, determine a subimage shift for each of the plurality of subimages, and calibrate the imaging system utilizing the subimage shifts for each of the plurality of subimages; and an assembly module configured to perform a high-resolution image assembly with the calibrated imaging system, wherein the assembly module configured to perform the high-resolution image assembly does not factor observed scene content.

12. A method for calibrating an imaging system to perform high-resolution image assembly, comprising the steps of:

for a plurality of distances less than a far-field calibration, defining a plurality of subimage shifts, the subimage shifts varying based on distance between an object and a target, calibrating the imaging system utilizing the plurality of subimage shifts; and performing a high-resolution image assembly with the calibrated imaging system, wherein the step of performing the high-resolution image assembly does not factor observed scene content.

13. The method of claim 12, wherein the step of defining a plurality of subimage shifts comprises the step of calculating a subimage shift for each of a plurality of distances less than a far-field calibration using the formula $\delta = xF/D$, wherein $\delta$ is the subimage shift, D is the distance, F is a lenslet focal length, and x is a separation of a lenslet center from an overall array center.

14. The method of claim 12, wherein the step of calibrating the imaging system utilizing the plurality of subimage shifts comprises storing the plurality of subimage shift values in a calibration module.

15. The method of claim 12, wherein the step of performing a high-resolution image assembly with the calibrated imaging system comprises the steps of:

determining the distance from the object to the target;

selecting the subimage shift associated with that distance; and processing an image with the selected subimage shift.

16. The method of claim 15, wherein the step of determining the distance from the object to the target comprises the step of receiving an input from a user of the imaging system comprising the distance from the object to the target.

17. The method of claim 15, wherein the step of determining the distance from the object to the target comprises the step of empirically deriving the distance from the object to the target.

18. The method of claim 15, further comprises the steps of:

processing the image with a plurality of subimage shifts; and presenting a plurality of images associated with the plurality of subimage shifts.

* * * * *